Figure 1:
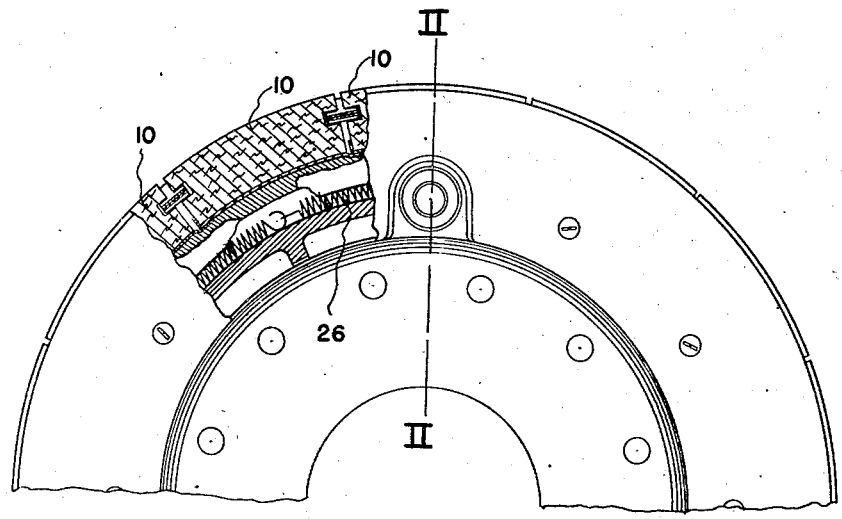

Oct. 29, 1946.  C. HOLLERITH  2,410,029
BRAKE BLOCK GUARD
Filed April 2, 1945

Inventor
CHAS. HOLLERITH
By Beaman & Langford
Attorney

Patented Oct. 29, 1946

2,410,029

UNITED STATES PATENT OFFICE 2,410,029

BRAKE BLOCK GUARD

Charles Hollerith, Jackson, Mich., assignor, by mesne assignments, to The B. F. Goodrich Company, Akron, Ohio, a corporation of New York Application April 2, 1945, Serial No. 586,220

1 Claim. (Cl. 188—152)

The present invention relates to improvements in brake structure having particular reference to brake structure of the type disclosed in my copending application, Serial No. 526,698, filed March 16, 1944.

The principal object of the present invention is to provide an improved guard to protect the sealing rings from detrimental wear, distortion and abrasion resulting from engagement between the sealing rings and the brake blocks actuated thereby.

Other objects and advantages of the present invention residing in the combination, construction and arrangement of parts will be more fully understood from a consideration of the following specification and annexed claim.

Figure 2:
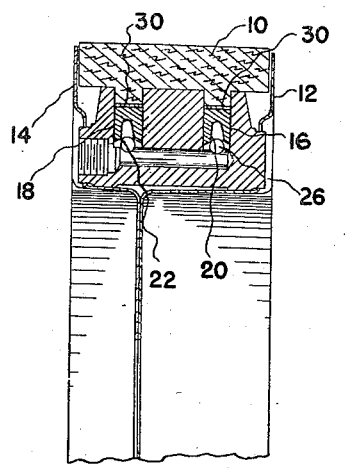
Figure 3:
Figure 4:
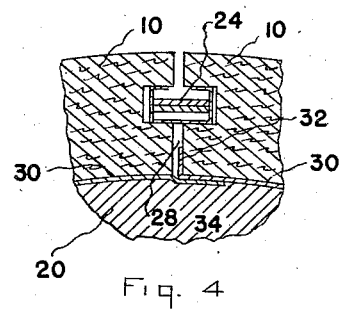

In the drawing:

Fig. 1 is a fragmentary side elevational view of brake structure shown removed from the wheel with portions thereof in broken vertical cross-section, Fig. 2 is a cross-sectional view taken on line II—II of Fig. 1, Fig. 3 is a perspective view of one of the guard elements removed from the assembly, and Fig. 4 is an enlarged fragmentary cross-sectional view of a portion of the construction shown in cross section of Fig. 1.

In brake structure of the type to which the present invention has particular reference, the brake block 10 is supported for radial inward and outward movement between the sheet metal side members 12 and 14 constituting a channel-shaped rim. Located within the channel-shaped rim defined by the parts 12 and 14 is an annular member having annular channels 16 and 18 in which are located the radially expansible sealing rings 20 and 22, which are urged outwardly by hydraulic pressure against the brake block 10 to radially expand the same to apply the brakes. Retractor springs 24 more fully disclosed in my aforesaid copending application hold the brake blocks 10 in assembled relation and function to retract the same on brake release. The sealing rings 20 and 22 are preferably of synthetic rubber construction and are shown as being U-shaped in cross section. Coil springs 26 are shown employed to assist in positioning the sealing rings 20 and 22 in intimate relation to the side walls of the grooves or channels 16 and 18.

As more clearly shown in Fig. 4, the adjacent brake blocks 10 are slightly spaced as at 28 when supported within the channel rim defined by the parts 12 and 14 in their retracted position. As will be readily apparent, the radial expansion brake block 10 at the time of brake application has the effect of increasing the width of the spacing 28. Unless some provisions are made to protect the sealing rings 20 and 22, the rings being of relatively soft pliable material will be extruded into the spaces 28, resulting in rapid deterioration of the sealing rings 20 and 22.

To overcome the aforesaid problem, according to the present invention a plurality of sheet metal stampings 30 are provided which are of general arcuate shape having a curvature corresponding to that of the underside of the brake block 10. The recessings 30 hereinafter referred to as guards have an upright flange portion 32 at one end adapted to extend into the space 28 between the adjacent brake blocks 10. At the opposite end an offset portion 34 is provided to underlap the opposite ends of the adjacent guards 30, as more clearly shown in Fig. 4. It will be understood that the guards 30 are of approximately the same width as the channels 16 and 18 and as a result of the overlapping end arrangement, as shown in Fig. 4, the entire thrust of the sealing rings 20 and 22 against the brake block 10 is taken through the guards 30.

By having the upright flange 32 positioned in the space 28 between opposed ends of adjacent brake blocks 10, the guards 30 are held against misplacement. It will also be noted from Fig. 4 that the offset portions 34 overlap the end of the adjacent guards 30 a sufficient distance to compensate for the maximum increase in the width of the space 28 that takes place on brake application resulting from radial displacement of the brake block 10.

Having thus described my invention, what I consider to be new and desire to claim by Letters Patent is:

A radial brake comprising an annular frame having an outer relatively wide channel, segmental arcuate brake blocks supported in said outer channel for radial movement, an inner relatively narrow channel, a sealing ring disposed in said inner channel to form an annular chamber with the walls thereof, adapted to be radially expanded to actuate said brake blocks, guard and thrust members disposed in said narrow channel and corresponding in width thereto, said members each having an upright flange at one end adapted to be received between opposed ends of adjacent brake blocks, the overall length of said members being in excess of that of the brake blocks in order to overlap the parting lines between adjacent brake blocks, means to retract said brake blocks, and structure defining said inner channel against which said brake blocks are retracted by said means.

CHARLES HOLLERITH.